US007176810B2

(12) United States Patent
Inoue

(10) Patent No.: US 7,176,810 B2
(45) Date of Patent: Feb. 13, 2007

(54) ON-VEHICLE DSRC APPARATUS

(75) Inventor: Masahiro Inoue, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/724,604

(22) Filed: Dec. 2, 2003

(65) Prior Publication Data

US 2004/0212517 A1 Oct. 28, 2004

(30) Foreign Application Priority Data

Apr. 23, 2003 (JP) ............................ 2003-118820

(51) Int. Cl.
*H04Q 7/20* (2006.01)
*G08G 1/09* (2006.01)

(52) U.S. Cl. .................... 340/905; 340/10.1; 340/7.33; 340/7.34; 340/7.38; 455/343.2

(58) Field of Classification Search .... 340/10.1–10.52, 340/7.32–7.38, 572.1, 905; 342/42, 44, 51; 455/343.1–343.6
See application file for complete search history.

(56) References Cited

U.S. PATENT DOCUMENTS 4,922,178 A * 5/1990 Matuszewski et al. ...... 320/111
4,950,913 A * 8/1990 Kephart ..................... 307/10.7
4,977,611 A * 12/1990 Maru ...................... 455/161.2
5,140,698 A * 8/1992 Toko .......................... 455/76
5,203,020 A * 4/1993 Sato et al. .................... 455/68
5,300,875 A * 4/1994 Tuttle ......................... 320/138
5,425,032 A * 6/1995 Shloss et al. ............... 370/346
5,430,441 A * 7/1995 Bickley et al. ............ 340/10.2
5,448,110 A * 9/1995 Tuttle et al. ................ 257/723
5,471,212 A * 11/1995 Sharpe et al. ................. 342/51
5,495,233 A * 2/1996 Kawashima et al. ... 340/825.21
5,525,992 A * 6/1996 Froschermeier ............ 340/10.2
5,682,603 A * 10/1997 Sano ....................... 340/10.33
5,774,876 A * 6/1998 Woolley et al. ............... 705/28
5,838,257 A * 11/1998 Lambropoulos ........... 340/5.61
6,011,483 A * 1/2000 Tanaka et al. ........... 340/10.33
6,031,465 A * 2/2000 Burgess ..................... 340/5.54
6,130,602 A * 10/2000 O'Toole et al. .......... 340/10.33
6,133,871 A * 10/2000 Krasner ................. 342/357.06
6,166,649 A * 12/2000 Inoue ......................... 340/660

(Continued)

FOREIGN PATENT DOCUMENTS

JP 2994362 10/1999

*Primary Examiner*—Jeffery Hofsass
*Assistant Examiner*—Anne V. Lai
(74) *Attorney, Agent, or Firm*—Sughrue Mion, PLLC

(57) ABSTRACT

An on-vehicle DSRC apparatus capable of being operated with a battery power supply while decreasing power consumption includes a radio unit (1) for performing communication with an on-road radio equipment (30), a data processing unit (2) for processing data received from the radio unit (1), a battery (3) for supplying an electric power to the radio unit (1) and the data processing unit (2) and a first power switch (4) inserted in a power supply line extending between the battery (3) and a combination of the radio unit (1) and the data processing unit (2). The first power switch (4) is imparted with a function for controlling the power supply from the battery (3) so that the power can be saved. In case use of the on-vehicle apparatus is unnecessary, a power supply is interrupted for saving electric energy to prolong the battery life.

3 Claims, 6 Drawing Sheets

U.S. PATENT DOCUMENTS 6,181,023 B1 * 1/2001 Inoue ........................ 307/10.1
6,380,845 B2 * 4/2002 Tuttle ........................ 340/10.4
6,529,714 B1 * 3/2003 Nakamura et al. ....... 455/575.1
6,593,845 B1 * 7/2003 Friedman et al. ........ 340/10.33
RE38,338 E * 12/2003 Yoshida et al. ............ 307/10.2

* cited by examiner

ON-VEHICLE DSRC APPARATUS

BACKGROUND OF THE INVENTION

1. Field of the Invention

The present invention generally relates to an apparatus mounted on an automobile or motor vehicle for a dedicated short-range communication (hereinafter this apparatus will be referred to as the on-vehicle DSRC apparatus for short), which apparatus is employed in a dedicated short-range communication or DSRC system as one of the intelligent transport systems (also referred to as the ITS for short). More particularly, the present invention is concerned with the on-vehicle DSRC apparatus (hereinafter also referred to simply as the on-vehicle apparatus) which can enjoy not only the prolonged or extended life of a battery employed for supplying electric power to the on-vehicle apparatus for operation thereof by controlling or restraining the power consumption of the on-vehicle apparatus but also ensure an improved mounting facility for the on-vehicle DSRC apparatus.

2. Description of Related Art

In general, the on-vehicle DSRC apparatus is designed for the short-range communication only within a limited area or range of a road by making use of radio wave of a microwave band. More specifically, the radio communication is conducted between an on-road radio equipment installed at an appropriate location of a road and the on-vehicle DSRC apparatus for transferring data in the form of radio signals to thereby carry out various services such as the toll collection service, road information presentation service and the like, providing thus profitable conveniences for the drivers of motor vehicles, the managers who are in charge of controlling the traffic, parking area(s) and others.

As the systems in which the dedicated short-range communication or DSRC is adopted, there may firstly be mentioned the electronic toll collection system or ETC system for short. In addition, there are conceived the systems for toll collection at gas stations and drive-throughs, traffic information presentation services, etc., and for other various applications.

Among others, in the system or application for discounting the toll imposed on the motor vehicles having through a specified lane or lanes, as typified by the Environmental Road Pricing System as well as in other applications, there are conceived such types of discounts as "discount during special limited period", "discount for customers" or the like. In short, the DSRC transaction system will be utilized not only for the accounting or toll collection but also for the toll discount and other various transactions in the not-so-distant future.

In the conventional on-vehicle DSRC apparatus known heretofore, the power supply (current feeding) to a radio unit and a data processing unit both incorporated in the on-vehicle DSRC apparatus is effected from an on-vehicle battery (i.e., battery mounted on the motor vehicle) and thus the circuits of both the radio unit and the data processing unit of the on-vehicle DSRC apparatus or some of these circuits are driven continuously, respectively, i.e., electrically energized continuously. For more particulars, reference may have to be made to, for example, Japanese Patent No. 2994362.

In this conjunction, it is noted that the radio unit and the data processing unit are generally implemented in a low-noise circuit structure with a view to preventing occurrence of bit errors in the received data. For this reason, the current or power consumption of the radio unit and the data processing unit is relatively large (ordinarily on the order of 100 mA in the continuous operation mode).

By the way, in recent years, the need for battery-driven type on-vehicle DSRC apparatus is increasing for making it possible to use the on-vehicle apparatus for the motor bicycles and/or with a view to improving the mounting facility or mountability of the on-vehicle DSRC apparatus.

However, in the conventional on-vehicle DSRC apparatus, the power consumption in the radio unit and the data processing unit is large (on the order of 100 mA), as mentioned above. This means that the time for continuous use of the on-vehicle DSRC apparatus is too short (about 5 hours) to be used in the practical applications, even if the battery of the capacity of about 500 mAH for e.g. portable phones is employed.

Furthermore, even in the case where the motor vehicle equipped with the DSRC apparatus is parking, rendering it unnecessary to use the ETC, the on-vehicle DSRC apparatus is continuously supplied with electric power, which means that the electric energy or power stored in the battery is wastefully used.

As is apparent from the above, the conventional on-vehicle DSRC apparatus suffers a problem that the practical utility is very poor because the power consumption of the radio unit and the data processing unit is ordinarily large and because the battery is wastefully used even in the situations where there is no need for effectuating the ETC operation.

Further, even in the case where the capacity of the battery incorporated in the on-vehicle DSRC apparatus becomes lower, it is impossible to recognize or detect the timing for exchanging the battery with a fresh one until the on-vehicle DSRC apparatus can not operate at all. Needless to say, when the battery capacity has been consumed, the on-vehicle DSRC apparatus can no more be used, unless the battery is exchanged, giving rise to another problem.

Moreover, since the on-vehicle DSRC apparatus is obligated not to be easily dismounted for the burglarproof purpose, it is necessary to transport a battery charger to a location of the on-vehicle DSRC apparatus mounted on the motor vehicle on the condition that the battery which can be electrically charged is employed as the built-in battery for the on-vehicle DSRC apparatus.

SUMMARY OF THE INVENTION

In the light of the state of the art described above, it is an object of the present invention to provide an on-vehicle DSRC apparatus which can be driven or operated by a built-in battery while reducing or restraining the power consumption of the on-vehicle DSRC apparatus when it is operating in a communication area detection mode.

In particular, it is an object of the present invention to provide an on-vehicle DSRC apparatus in which a power source incorporated in the on-vehicle apparatus is turned off when the use of the on-vehicle DSRC apparatus is unnecessary as in the case where a relevant motor vehicle is parking while power supply (current feeding) to a detecting circuit is intermittently conducted when the on-vehicle DSRC apparatus is operating in the communication area detection mode, to thereby decrease or suppress the power consumption of the battery.

Another object of the present invention is to provide an on-vehicle DSRC apparatus in which a solar battery is used in combination with a battery capable of being charged for the purpose of extending the battery life by causing the solar battery to charge the battery.

In view of the above and other objects which will become apparent as the description proceeds, there is provided according to a general aspect of the present invention an on-vehicle DSRC apparatus employed for a dedicated short-range communication in an intelligent transport system, which includes a radio unit for performing communication with an on-road radio equipment installed at a location associated with a road, a data processing unit for processing data received from the radio unit, a battery for supplying an electric power to the radio unit and the data processing unit, and a first power switch inserted in a power supply line extending between the battery on one hand and the radio unit and the data processing unit on the other hand.

The first power switch is imparted with a function for effectuating a power save by controlling the power supply from the battery such that saving of the electric energy of the battery can be achieved.

By virtue of the arrangement described above, there can be realized the on-vehicle DSRC apparatus whose battery serving as the power source for the apparatus can be employed over a significantly extended use life or without need for exchange of the battery.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
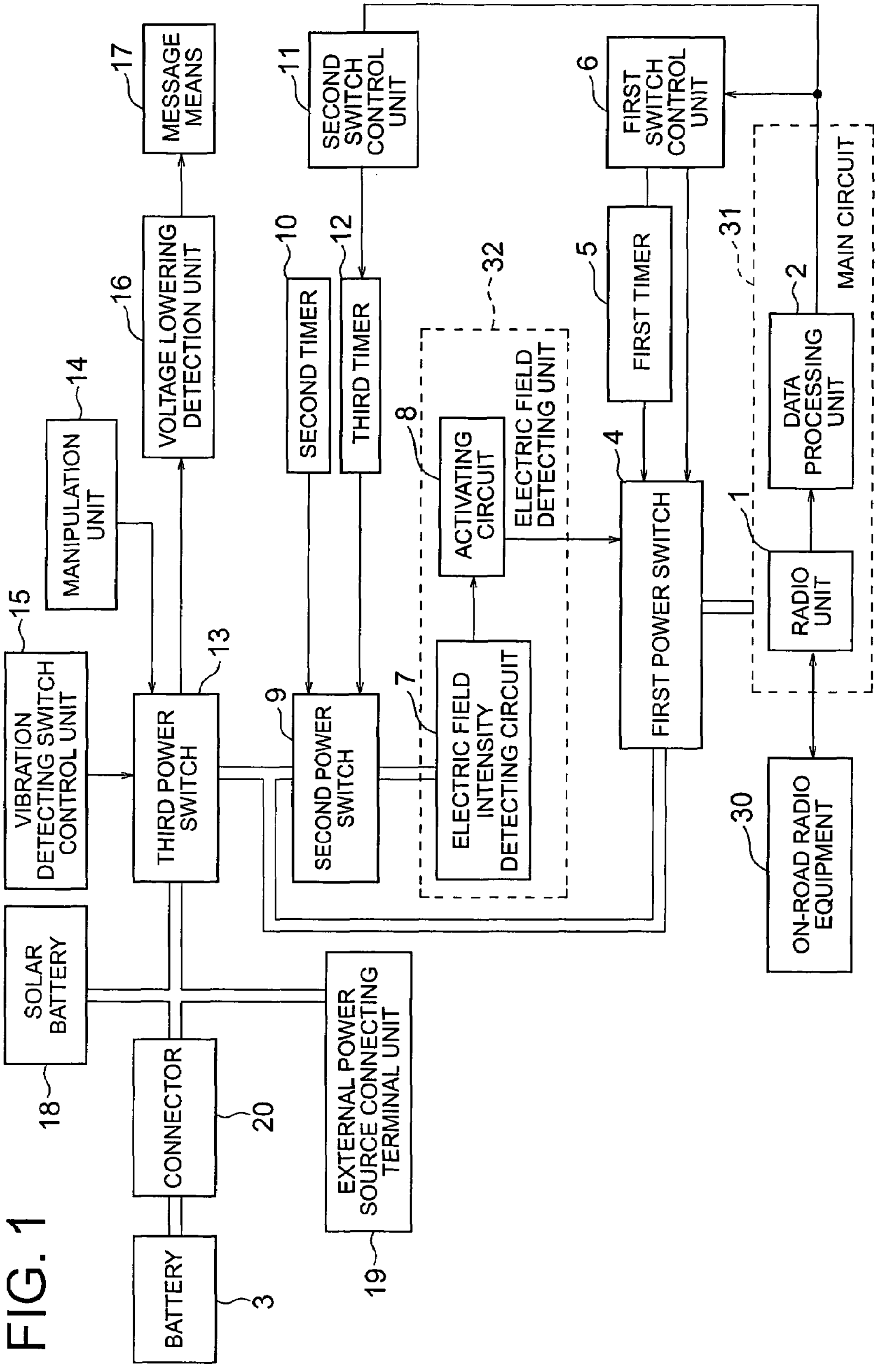
FIG. 1 is a block diagram showing a configuration of an on-vehicle DSRC apparatus according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

Now, referring to the drawings, description will be made of the on-vehicle DSRC apparatus according to a first embodiment of the present invention.

Figure 2:
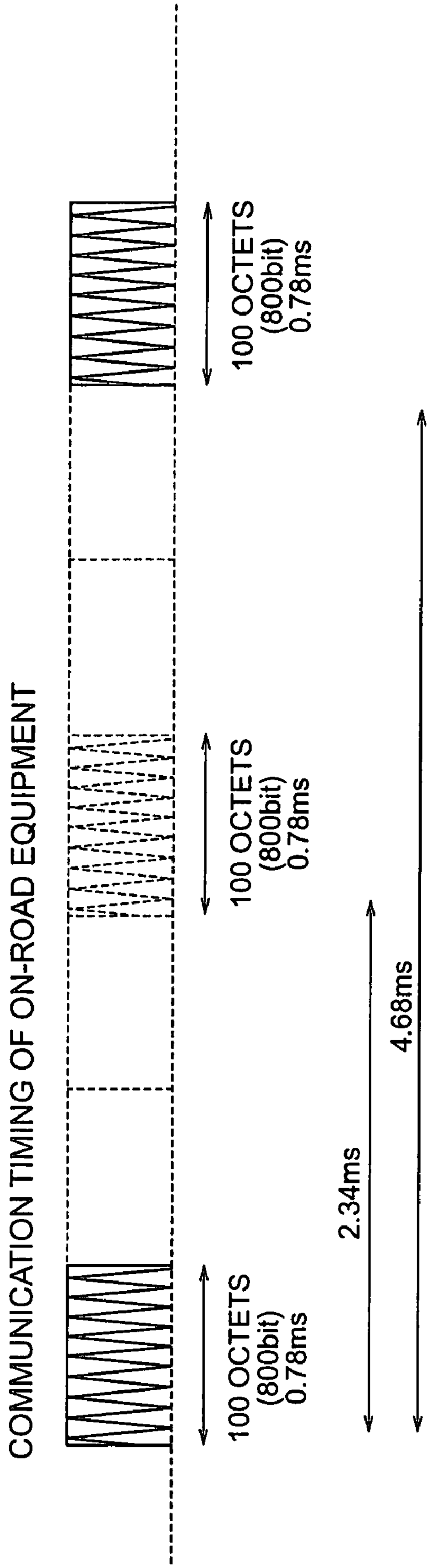
FIG. 2 is a timing chart for illustrating timing of communication from a DSRC on-road equipment according to the first embodiment of the invention.
Figure 3:
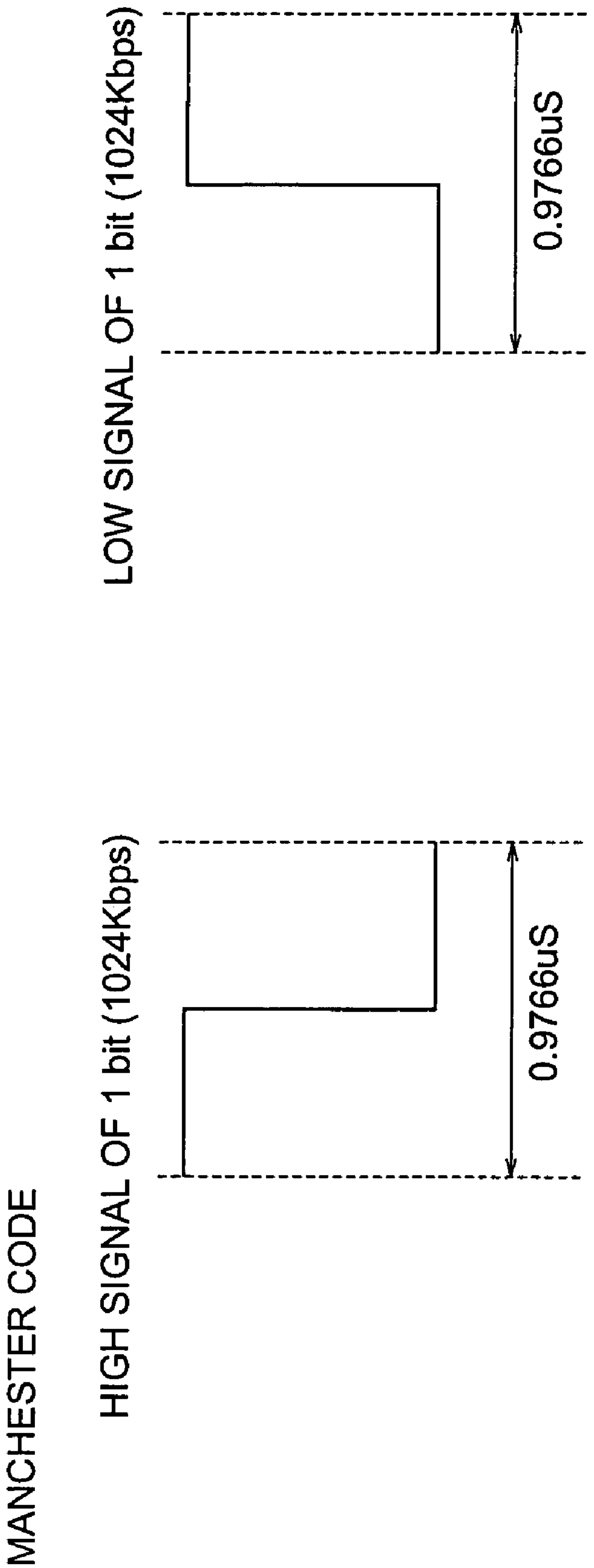
FIG. 3 is a view for illustrating Manchester codes used in an amplitude modulation of signal in the first embodiment of the invention.
Figure 4:
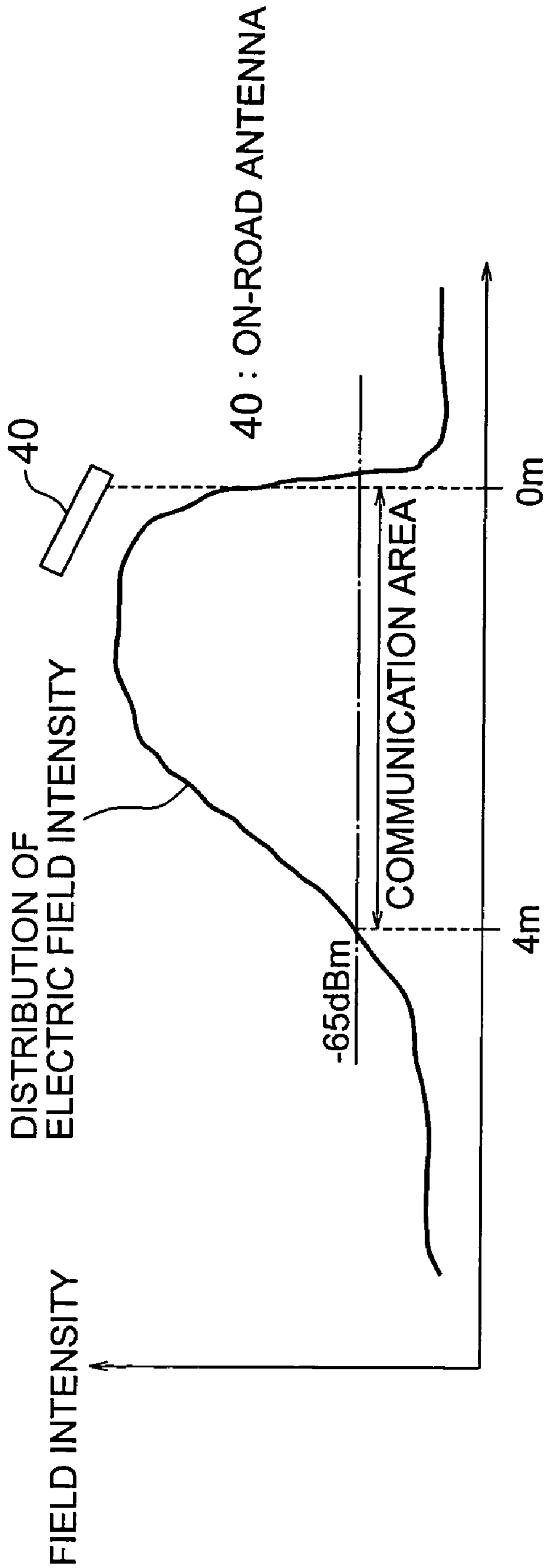
FIG. 4 is a view for graphically illustrating a relation between distribution of the field intensity of the radio wave transmitted from the on-road DSRC equipment and a communication area.
Figure 5:
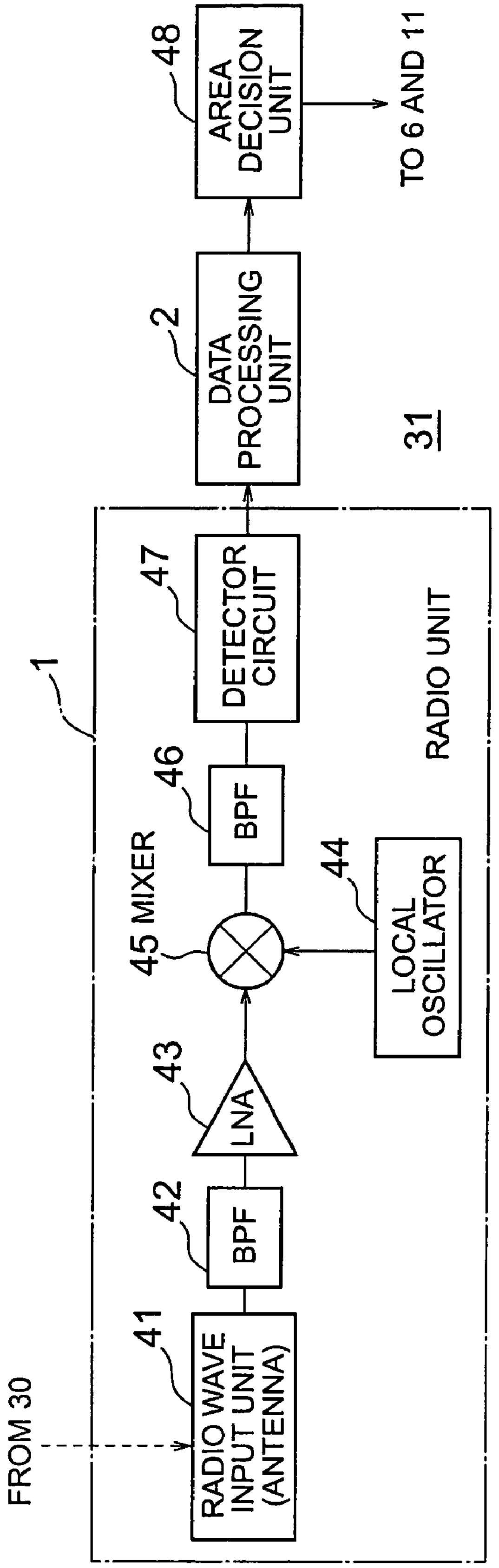
FIG. 5 is a functional block diagram showing an exemplary circuit arrangement of a radio unit and a data processing unit which constitute parts of the on-vehicle DSRC apparatus shown in FIG. 1.
Figure 6:
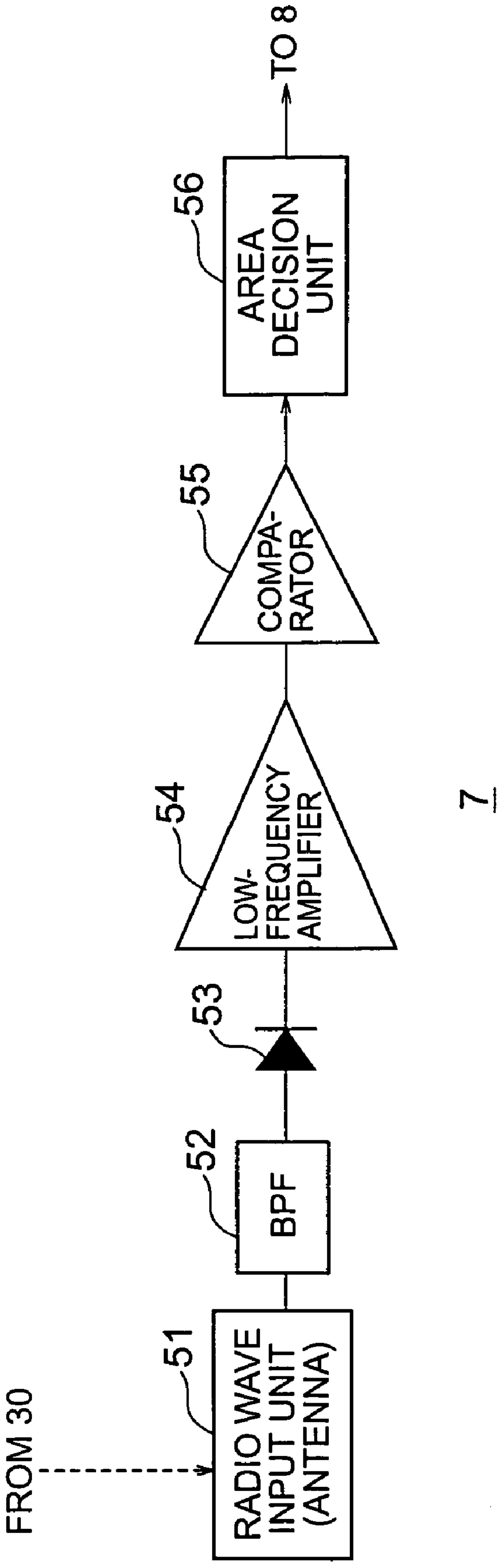
FIG. 6 is a functional block diagram showing an exemplary circuit arrangement of an electric field intensity detecting circuit incorporated in the on-vehicle DSRC apparatus shown in FIG. 1.

FIG. 1 is a block diagram showing a configuration of the on-vehicle DSRC apparatus according to the first embodiment of the invention. In the figure, signal transmission lines are indicated by solid lines with or without arrows while power supply lines are indicated by triple lines. Further, FIG. 2 is a timing chart for illustrating the timing of communication from an on-road DSRC equipment (equipment installed on a road), FIG. 3 is a view for illustrating Manchester codes (signals "HIGH" and "LOW") used in an amplitude modulation of signal, FIG. 4 is a view for graphically illustrating a relation between distribution of the field intensity of radio wave transmitted from the on-road DSRC equipment and a communication area, FIG. 5 is a functional block diagram showing an exemplary circuit arrangement of a radio unit and a data processing unit constituting parts of the on-vehicle DSRC apparatus shown in FIG. 1, and FIG. 6 is a functional block diagram showing an exemplary circuit arrangement of an electric field intensity detecting circuit incorporated in the on-vehicle DSRC apparatus shown in FIG. 1.

Referring to FIG. 1, a main circuit 31 of the on-vehicle DSRC apparatus includes a radio unit 1 for performing communication with an on-road radio equipment 30 installed at an appropriate location associated with a road and a data processing unit 2 for processing data transferred from the radio unit 1.

A battery 3 which can electrically be charged is incorporated in the on-vehicle DSRC apparatus for supplying electric power (or feeding electric current) to electrical circuits constituting the radio unit 1 and the data processing unit 2 and others.

A first power switch 4 is inserted in a power supply line extending between the battery 3 and the main circuit 31 composed of the radio unit 1 and the data processing unit 2. This first power switch 4 is imparted with a function for controlling the power supply to the main circuit 31 from the battery 3 such that the power saving can be realized, i.e., wasteful or ineffective power consumption can be prevented, to say in another way. To this end, the first power switch 4 is so designed as to interrupt the power supply from the battery 3 so long as the operation of the radio unit 1 and the data processing unit 2 is not required. By way of example, when a motor vehicle concerned (i.e., motor vehicle equipped with the on-vehicle DSRC apparatus) is parking or when the vehicle is not running on an expressway, the power supply to the main circuit 31 is unnecessary. Accordingly, the first power switch 4 is turned off or opened.

A first timer 5 is provided for the purpose of driving intermittently the first power switch 4. To say in another way, by providing the first timer 5, the first power switch 4 is adapted to intermittently supply the electric power to the radio unit 1 and the data processing unit 2 from the battery 3 when the power supply to the main circuit 31 is demanded.

Provided in association with the first power switch 4 and the first timer 5 is a first switch control unit 6 which is designed to control the ON/OFF operation of the first power switch 4 in dependence on the output signal from the data processing unit 2. In other words, the first switch control unit 6 is so designed as to set the first power switch 4 to an intermittently driven mode or a continuous operation mode with the aid of the first timer 5.

The on-vehicle DSRC apparatus is additionally provided with an electric field detecting unit 32 as an electrical circuit discretely from the main circuit 31. The electric field detecting unit 32 is comprised of an electric field intensity detecting circuit 7 and an activating circuit 8. The electric field intensity detecting circuit 7 is designed to detect the field intensity of the radio wave transmitted from the on-road radio equipment 30 while the activating circuit 8 is designed to function as a driving circuit for controlling the operation of the first power switch 4. More specifically, when the detection output of the electric field intensity detecting circuit 7 assumes a level higher than a predetermined level inclusive, the activating circuit 8 starts operation of the first power switch 4, i.e., activates the first power switch 4.

A second power switch 9 is inserted between the battery 3 and the electric field detecting unit 32 for controlling the power supply to the electric field intensity detecting circuit 7 and the activating circuit 8 from the battery 3.

A second timer 10 which serves for the function similar to that of the first timer 5 is provided for intermittently driving the second power switch 9 to thereby make the electric power be intermittently supplied to the electric field detecting unit 32.

Provided in association with the second power switch 9 is a second switch control unit 11 which serves for controlling ON/OFF operation of the second power switch 9 in dependence on the output signal of the data processing unit 2.

A third timer 12 is inserted between the second switch control unit 11 and the second power switch 9 for imparting a predetermined time lag to the output of a power supply start signal issued by the second switch control unit 11.

A third power switch 13 is provided on the output side of the battery 3 and adapted to be turned ON/OFF (closed/opened) by a manipulation unit 14 or a vibration detecting switch control unit 15.

More specifically, the manipulation unit 14 is designed to manually control the third power switch 13 between the ON and OFF states. With this arrangement, further power saving can be achieved by inhibiting the power supply to the on-vehicle DSRC apparatus in the case where the motor vehicle is parking or not running on the expressway, by way of example.

Further provided is a vibration detecting switch control unit 15 which is so designed as to open the third power switch in the state where no vibration is applied (e.g. parking state) whereas in a vibration state where vibration is applied (e.g. vehicle start state), the vibration detecting switch control unit 15 detects vibration applied to the on-vehicle DSRC apparatus to thereby drive the third power switch 13.

More specifically, the vibration detecting switch control unit 15 functions with priority over the manipulation unit 14 for preventing wasteful power consumption due to forgetting to turn off or open the third power switch 13 while preventing the third power switch 13 from being unintentionally left in the off state when the motor vehicle is running.

The on-vehicle DSRC apparatus further includes a voltage lowering detection unit 16 which is designed for detecting lowering of the output voltage (source voltage) of the battery 3 by way of the third power switch 13. When the source voltage is lower than a predetermined level (a comparison reference value corresponding to the concerned low voltage), the voltage lowering detection unit 16 activates a message means 17 such as a buzzer, an alarm, an LED or the like for messaging the operator or driver of the voltage-lowered state to thereby indicate the necessity for exchange of the battery 3.

A solar battery 18 is additionally disposed on the output side of the battery 3. With this arrangement, it is possible to electrically charge the battery 3 by the photovoltaic power generation, whereby the working life of the battery 3 can be prolonged or the exchange of the battery 3 can be made unnecessary.

Further provided on the output side of the battery 3 is an external power source connecting terminal unit 19 for the purpose of making it possible to supply the electric power to the electrical circuits of the on-vehicle DSRC apparatus from other power source such as an on-vehicle power source typified by non-vehicle battery to thereby electrically charge the battery 3 when the capacity of the battery 3 is consumed. In this conjunction, it is to be added that the external power source connecting terminal unit 19 may include a voltage control unit in order to transform an external source voltage to a level suited for electrically charging the battery 3.

Further provided additionally on the output side of the battery 3 is a connector 20 for making it possible to removably attaching the battery 3 to the on-vehicle DSRC apparatus. By virtue of this arrangement, only the battery 3 can be dismounted from the on-vehicle DSRC apparatus upon charging of the battery 3, whereby charging of the battery 3 by using a battery charger can be much facilitated. Besides, the battery 3 can easily be exchanged with a spare one.

Next, referring to FIG. 4, the communication area may be set to a range or area whose outer limit is distanced by e.g. 4 meters from a reference position that corresponds to the position (zero meter) of an antenna 40 which constitutes a part of the on-road radio equipment 30. This antenna will also be referred to as the on-road antenna for the convenience of description.

Referring to FIG. 5, the radio unit 1 of the main circuit 31 is comprised of a radio wave input unit (antenna) 41, a bandpass filter 42 for filtering the radio signal received through the radio wave input unit 41, a low noise amplifier 43 for amplifying the output signal of the bandpass filter 42, a local oscillator 44 for outputting a predetermined frequency signal, a mixer 45 for mixing the received signal outputted from the low noise amplifier 43 with the frequency signal outputted from the local oscillator 44, a bandpass filter 46 for filtering the output signal of the mixer 45, and a detector circuit 47 for detecting the output signal of the bandpass filter 46.

Further, the main circuit 31 is equipped with an area decision unit 48 for deciding or recognizing the communication area on the basis of the output signal of the data processing unit 2.

Referring to FIG. 6, the electric field intensity detecting circuit 7 is comprised of a radio wave input unit (antenna) 51, a bandpass filter 52 for filtering the signal received through the medium of the radio wave input unit 51, a diode 53 for allowing the filtered signal to pass therethrough, a low-frequency amplifier 54 for amplifying the received radio signal having passed through the diode 53, a comparator 55 for comparing the output signal of the low-frequency amplifier 54 with a predetermined level, and an area decision unit 56 for deciding or recognizing the communication area on the basis of the output signal of the comparator 55.

At this juncture, it should be mentioned that the radio wave input unit 51 may be used in common as the radio wave input unit 41 provided for the radio unit 1.

Next, referring to FIGS. 5 and 6 together with FIGS. 2 to 4, description will be directed to the operation of the on-vehicle DSRC apparatus according to the first embodiment of the present invention shown in FIG. 1.

Referring to FIG. 2, the radio wave sent out from the on-road radio equipment (i.e., radio equipment installed at an appropriate location of a road) 30 of the on-road equipment is periodically transmitted at an interval of about 2.34 ms (see broken-line waveform) with a time duration (width) of about 0.78 ms carrying information of 100 octets (800 bits).

Alternatively, the radio wave may be transmitted periodically at an interval of about 4.68 ms on a time division basis (see solid-line waveforms).

In this case, during the time duration or period of about 0.78 ms, Manchester codes are sent in the form of an amplitude-modulated signal at a rate of 1024 k bps (bits per second) Thus, for detecting the communication area by means of the main circuit 31 on the basis of the data transmitted from the on-road radio equipment 30, the first power switch 4 is closed at least for 2 μS during the period of 0.78 ms to thereby cause the data processing unit 2 to execute the processing of the data. In that case, when one bit of "HIGH" can be detected as the result of the data processing executed by the data processing unit 2, it can then be decided that the area in which the motor vehicle concerned exists currently is a "communication area". The first timer 5 is so controlled that the process mentioned above can be realized.

In this conjunction, it should be noted that since the data received from the on-road radio equipment 30 has undergone the Manchester coding and thus contains "HIGH" signal bit or "LOW" signal bit, as can be seen in FIG. 3, the data assumes the level "HIGH" at least during the duty period of 1 μS which is a half of the above-mentioned period of 2 μS.

When it is decided that the current area is the communication area with one bit of "HIGH" being detected by the main circuit 31, the first switch control unit 6 controls the first power switch 4 to set it in the continuous operation mode until the data processing has been completed.

Through the control mentioned just above, the first power switch 4 is intermittently driven or activated so long as the motor vehicle is outside of the communication area. In this manner, the circuit of low power consumption can be realized. By way of example, when comparing with the case where the first power switch 4 is continuously closed, the power consumption can be reduced to "1/390(2 μS/0.78 ms)".

In particular, for the DSRC, the area or rage of 4 m (meters) is set in which the field level is higher than −65 dBm inclusive, as can be seen in FIG. 4. Obviously, the DSRC area is very narrow.

Accordingly, intermittent driving of the first power switch 4 in the area outside of the communication area, which does not bring about essentially any noticeable problem, can make a remarkable contribution toward lowering the electric power consumption. Further, from the global standpoint, the first power switch 4 may intermittently be driven consecutively (100%) during the whole operation period without incurring any especial problem.

At this juncture, let's assume that the battery of about 500 mAH is employed in the situation similarly to that described previously. In that case, computing the life of the battery 3, it can be extended by a factor of "390" since the power consumption is reduced to 1/390.

Thus, the period during which the battery 3 can be employed continuously is:

1950 hours (81 days)=5 hours×390.

Furthermore, even when the period during which the first power switch 4 is closed is set to be 10 μS by taking into consideration the time required for activation and interruption of the circuit operation in practical applications, the period in which the battery can be employed continuously is 390 hours (16 days)=5 hours×78.

In other words, the battery can continuously be employed about two weeks.

In the on-vehicle DSRC apparatus shown in FIG. 1, the first power switch 4 is ordinarily opened (OFF) while the second power switch 9 and the third power switch 13 are closed (ON). Thus, the power supply to the radio unit 1 and the data processing unit 2 is interrupted with only the electric field intensity detecting circuit 7 and the activating circuit 8 being electrically energized.

In general, the main circuit 31 composed of the radio unit 1 and the data processing unit 2 is implemented in a low-noise circuit configuration with a view to suppressing occurrence of bit errors in the received data, as can be seen in FIG. 5. Consequently, the necessity for power supply to the data processing unit 2, as described previously, is accompanied with a relatively large current (e.g. on the order of 100 mA).

By contrast, the electric field intensity detecting circuit 7 can be implemented in a relatively simple circuit configuration, as can be seen in FIG. 6. By virtue of this feature, the current consumption in the electric field intensity detecting circuit 7 can significantly be reduced. More concretely, the electric field intensity detecting circuit 7 can operate with the current of about 30 mA.

For this reason, only the electric field intensity detecting circuit 7 capable of operating with low current consumption is ordinarily put into operation, and when the communication area is detected by the electric field intensity detecting circuit 7, then the first power switch 4 is activated (closed) to effectuate the power supply to the radio unit 1 and the data processing unit 2 for detecting the received data.

In this way, significantly low current or power consumption can be realized.

The second power switch 9 is designed to be activated ordinarily at least for 2 μS during the period, of 0.78 ms under the intermittent drive control performed by the second timer 10 to thereby validate the field intensity detection. At the time point when the field intensity exceeds the predetermined level (e.g. −65 dBm or more), the first power switch 4 is set to the continuous operation mode through the medium of the activating circuit 8, whereby the radio unit 1 and the data processing unit 2 are activated to detect the data sent from the on-road radio equipment.

Owing to the intermittent drive control of the second power switch, the power consumption can further be brought down.

At this juncture, the battery life 3 can be computed on the conditions mentioned previously as follows:

500 mAH/(30 mA×20 μS/0.78 ms)=1300 hours (54 days)

As is apparent from the above, the battery 3 can be employed consecutively approximately over two months.

Further, when the data processing is being executed through cooperation of the radio unit 1 and the data processing unit 2, detection of the communication area and hence the power supply (i.e., power supply) to the electric field intensity detecting circuit 7 are ordinarily unnecessary.

Accordingly, the second switch control unit 11 and the third timer 12 for driving the second power switch 9 with a predetermined time lag in response to the power supply start signal issued by the second switch control unit 11 are additionally provided to thereby allow the data processing unit 2 to issue the communication end signal to the second switch control unit 11 upon completion of the communication. In response to this communication end signal, the second switch control unit 11 restores the intermittent driving of the second power switch 9 by the second timer 10 after the lapse of the predetermined lag time under the control of the data processing unit 2.

In the dedicated short-range communication, once the short-range communication through one antenna has been completed, there is no necessity to perform again the communication with that antenna. Of course, there will arise no situation for conducting the communication with another antenna in succession. Accordingly, the power supply to the electric field intensity detecting circuit 7 may be started after the lapse of the predetermined or given time from the end of the communication.

Accordingly, the power supply through the second power switch 9 is restarted in response to the communication end signal issued by the data processing unit 2 with the predetermined time lag set at the third timer 12.

As is apparent from the above, by additionally providing the third timer 12, the time duration of the power supply through the second power switch 9 can be shortened and at the same time the current consumption otherwise brought about by the useless activation of the first power switch 4 can be reduced to a minimum. Thus, even in the situation that the motor vehicle is forced to stay within the communication area due to traffic jam or the like, reactivation of the second power switch 9 can be prevented during the predetermined effective time lag period set at the third timer 12.

By placing the third power switch 13 between the battery 3 and the electrical circuit and providing the manipulation unit 14 for manually controlling the on/off states of the third power switch 13, it is possible to inhibit the power supply to the on-vehicle DSRC apparatus when the motor vehicle is parking or unless the expressway is used.

At this juncture, let's compute the ratio of the battery life to that mentioned hereinbefore on the assumption that the motor vehicle is operated 6 days within one week at the rate of 10 hours a day, i.e., (24 hours×7 days)/(10 hours×6 days). From the above computation, it will be appreciated that the battery life about 2.8 times as long as the previously computed time (1300 hours), i.e., 3460 hours (151 days), can be ensured.

Needless to say, the battery life can further be prolonged in dependence on the number of days in which the expressway is not used and/or the power supply to the on-vehicle DSRC apparatus is not effectuated.

Furthermore, by providing the vibration detecting switch control unit 15 for controlling the third power switch 13 in combination with the manipulation unit 14 or alternatively in place of the manipulation unit 14, it is possible to carry out such control that the third power switch 13 is closed for a predetermined time at the time point when vibration is applied to the on-vehicle DSRC apparatus under the influence of vibration of the motor vehicle occurring upon starting operation thereof.

Through the control mentioned above, the third power switch 13 can be maintained in the closed state under the effect of the vibration brought about by the rotation of the engine and roughness of the road, whereas the third power switch 13 can be automatically turned off upon parking of the motor vehicle.

By virtue of the control described above, the power source is automatically interrupted upon stopping of the motor vehicle, whereby the power supply can be prevented from being unintentionally left in the alive state.

When the output voltage of the battery 3 becomes lower than a predetermined level inclusive, the message means 17 is activated by the voltage lowering detection unit 16, prompting the operator or driver of exchange of the battery 3.

Moreover, by additionally providing the solar battery 18 connected to the output terminals of the battery 3, it is possible to constantly charge the battery 3 provided that it can be charged, whereby the life of the battery 3 can be extended. In addition, it is possible to make it unnecessary to exchange the battery as the case may be.

Further, by providing the external power source connecting terminal unit 19 including the voltage control unit for the output terminals of the battery 3, it is possible to supply the electric power from an external power source (e.g. power source for a cigarette lighter disposed internally of the motor vehicle not shown) after transforming the voltage to a level suited for charging the battery 3.

Accordingly, when the capacity of the battery 3 becomes lower, not only the battery 3 can be charged from the external power source but also the latter can be used as the power source for the power supply to the circuits included in the on-vehicle DSRC apparatus in place of the battery 3.

Incidentally, the voltage control unit may be incorporated in the on-vehicle DSRC apparatus.

Furthermore, by additionally providing the connector 20 on the output side of the battery 3 for facilitating detachment of the battery 3, it is possible to dismount only the battery 3 for charging it when it is necessary. Besides, exchange of the battery 3 with a spare battery can be facilitated.

In particular, when the on-vehicle DSRC apparatus is to be operated as the on-vehicle ETC (Electronic Toll Collection) apparatus, attachment thereof to the motor vehicle has to conform with relevant standards concerning the attachment of the apparatus on the motor vehicle. In conformance with the standards, the on-vehicle DSRC apparatus has to be implemented in a structure which is difficult to dismount the on-vehicle apparatus from the motor vehicle. Such being the circumstances, by making it possible to detach only the battery 3, charging of the battery 3 can be carried out with enhanced convenience. Besides, exchange with a spare battery is eased. Thus, the usability of the on-vehicle DSRC apparatus can significantly be enhanced.

In the case where the use of the on-vehicle DSRC apparatus is unnecessary (e.g. when the motor vehicle is parking or not running on the expressway), the first power switch 4 is set to the opened (or off) state. Owing to this feature, reduction of power consumption of the on-vehicle DSRC apparatus can positively be realized without fail, ensuring effective and efficient usability of the on-vehicle apparatus in practical applications.

In addition, with the arrangement that the power supply to the radio unit 1 and the data processing unit 2 is performed intermittently upon detection of the communication area, further reduction of the power consumption can be realized, whereby the life of the battery 3 is further extended, contributing to enhancement of efficient use of the battery.

Besides, by providing the electric field detecting unit 32 of a smaller circuit scale than the main circuit 31 and turning off the power sources for the other circuits until the field intensity higher than the predetermined level inclusive is detected upon detection of the communication area, power consumption can additionally be brought down.

Moreover, the effectuating intermittently the power supply to the electric field intensity detecting circuit 7 upon detection of the communication area, the power consumption can additionally be brought down.

Furthermore, the inhibition of unnecessary restoration of power supply to the electric field intensity detecting circuit 7 can contribute to further reduction of the power consumption.

As mentioned hereinbefore, in the state in which the motor vehicle is parking or not using the expressway, the second power switch 9 is opened to thereby inhibit the power supply to the on-vehicle DSRC apparatus. This feature can also provide a noticeable contribution to the reduction of the power consumption.

It should further be added that by virtue of such arrangement that the vibration detecting switch control unit 15 is provided for driving or turning on the third power switch 13 only when vibration applied to the on-vehicle apparatus is detected, the power supply to the electrical circuits is automatically interrupted when the motor vehicle is parking and at the same time it is possible to prevent the wasteful power consumption due to forgetting to open the third power switch 13, while preventing the third power switch 13 from being unintentionally left opened when the motor vehicle is being operated.

Furthermore, with such arrangement that the voltage lowering detection unit 16 and the message means 17 are provided for messaging lowering of the source voltage of the battery 3 concretely to the operator or driver upon detection of lowering of voltage, the driver can infallibly know the need for exchange of the battery 3 or the time for charging it, and thus the exchange of the battery 3 or charging of the battery can be carried out without fail.

Still more, by adopting the arrangement that the battery 3 is charged by the solar battery 18, the life of the battery 3 can further be prolonged, possibly rendering it unnecessary to exchange the battery 3.

Further, by providing the external power source connecting terminal unit 19, charging of the battery 3 can be realized without need for removing the on-vehicle DSRC apparatus from the motor vehicle or dismounting the battery 3 from the on-vehicle apparatus. Besides, in the case where driving of the on-vehicle DSRC apparatus by the battery 3 becomes impossible, an external power source may be employed as the emergency power source, ensuring thus high convenience for the user.

Furthermore, by providing the connector 20 which enables detachment of the battery 3, the work efficiency involved in removal of the battery 3 for the charging thereof can be enhanced. Besides, the exchange with a spare battery can be eased, to further convenience for the user.

Many features and advantages of the present invention are apparent from the detailed description and thus it is intended by the appended claims to cover all such features and advantages of the apparatus which fall within the spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

What is claimed is:

1. An on-vehicle DSRC apparatus employed for a dedicated short-range communication in an intelligent transport system, comprising:

a radio unit for performing communication with an on-road radio equipment installed at a location associated with a road;

a data processing unit for processing data received from said radio unit;

a battery for supplying an electric power to said radio unit and said data processing unit; and a first power switch inserted in a power supply line extending between said battery on one hand and said radio unit and said data processing unit on the other hand, wherein said first power switch is imparted with a function for effectuating a power save for control for the power supply from said battery so that electric energy of said battery can be saved, said on-vehicle DSRC apparatus further comprising:

an electric field intensity detecting circuit for detecting a field intensity of radio wave transmitted from said on-road radio equipment;

an activating circuit for activating said first power switch when a detection output of said electric field intensity detecting circuit becomes higher than a predetermined level inclusive thereof;

a second power switch inserted in a power supply line extending between said battery and said electric field intensity detecting circuit for controlling the power supply to said electric field intensity detecting circuit from said battery; and a first timer for intermittently driving said second power switch.

2. An on-vehicle DSRC apparatus according to claim 1, further comprising:

a switch control unit for controlling the power supply through said second power switch and interruption thereof in response to an output signal of said data processing unit.

3. An on-vehicle DSRC apparatus according to claim 2, further comprising:

a second timer for delaying starting of the power supply through of said second power switch in response to an output signal issued from said second switch control unit.

* * * * *